United States Patent

Kumamoto et al.

[11] Patent Number: 5,525,851
[45] Date of Patent: Jun. 11, 1996

[54] APPARATUS FOR PRODUCING HIGH-SPEED ROTATION

[75] Inventors: Satosi Kumamoto; Sin Tanoue; Masanori Wakuda, all of Shizuoka-ken, Japan

[73] Assignee: Toshiba Kikai Kabushiki Kaisha, Tokyo, Japan

[21] Appl. No.: 160,902

[22] Filed: Dec. 3, 1993

[30]     Foreign Application Priority Data

Dec. 4, 1992   [JP]   Japan .................................. 4-325206

[51] Int. Cl.⁶ .................................................. H02K 3/48
[52] U.S. Cl. .......................... 310/114; 310/112; 310/184; 310/262
[58] Field of Search ............................ 310/116, 115, 310/117, 114, 112, 180, 184, 262, 266, 254, 156, 176, 44

[56]            References Cited

U.S. PATENT DOCUMENTS

| 396,355 | 1/1889 | Dyer | 310/114 |
|---|---|---|---|
| 4,375,047 | 2/1983 | Nelson | 310/114 |
| 4,749,898 | 6/1988 | Suzuki | 310/114 |
| 5,334,899 | 8/1994 | Skybyk | 310/114 |

FOREIGN PATENT DOCUMENTS

| 3045820A1 | 7/1982 | Germany . |
|---|---|---|
| 3632161A1 | 11/1987 | Germany . |
| WO93/03535 | 2/1993 | WIPO . |

*Primary Examiner*—R. Skudy
*Attorney, Agent, or Firm*—Finnegan, Henderson, Farabow, Garrett & Dunner

[57]             ABSTRACT

An apparatus for producing high-speed rotation has a rotary shaft integrally having a first rotor with magnetic anisotropy, and a rotary sleeve disposed around the rotary shaft. The rotary sleeve has a first stator surrounding to the first rotor and integrally has a second rotor having magnetic anisotropy. The first stator has a field winding for magnetizing the first rotor in a predetermined direction. This winding is also an armature winding because it undergoes high-speed rotation with the second rotor. The rotary sleeve is received in a housing which has a second stator surrounding the second rotor. The second stator has a field winding for magnetizing the second rotor in a predetermined direction and for producing high-speed rotation of the second rotor. By analogy, the housing can become a further rotary sleeve, constructed similarly to the above-mentioned rotary sleeve.

6 Claims, 1 Drawing Sheet

APPARATUS FOR PRODUCING HIGH-SPEED ROTATION

BACKGROUND OF THE INVENTION

1. Technical Field

This invention relates to an apparatus for producing high-speed rotation and, in particular, to an electrical motor for rotating a shaft.

2. Background Art

The electrical motor mentioned above with one rotational axis has a rotor and a stator secured to a fixed member disposed on a motor housing so that the rotary shaft of the motor is rotated by the electromagnetic action between a set of the rotor and the stator.

In the motor mentioned above, any motor output, e.g. rotational frequency, depends on magnetic action between a set of the rotor and the stator. Therefore, the rotational frequency of a high-speed rotation motor is Inevitably limited in view of electromagnetic characteristics. Furthermore, the high-speed rotation motor requires a high rotational frequency at the bearing receiving the rotary shaft, thereby causing cooling and lubricating of the bearing for the rotary shaft to be difficult. Therefore, the rotational frequency of the motor is further limited.

SUMMARY OF THE INVENTION

It is, therefore, an object of the present invention on to provide an apparatus for producing high-speed rotation to provide high rotational frequency in spite of the foregoing limitations.

It Is another object of the present invention to provide an apparatus for producing high-speed rotation and simultaneously producing a plurality of motor outputs which are different from each other.

In order to achieve the object mentioned above, the present invention provides an apparatus for producing high-speed rotation, comprising:

- a rotary shaft Integrally having a first rotor with magnetic anisotropy,
- a rotary sleeve disposed around the rotary shaft, the rotary sleeve having a first stator corresponding to the first rotor and integrally having a second rotor having magnetic anisotropy, the first stator having a field winding for magnetizing the first rotor in a predetermined direction and an armature winding for producing high-speed rotation to the second rotor; and
- a housing having a second stator corresponding to the second rotor, the second stator having a field winding for magnetizing the second rotor in a predetermined direction and an armature winding for producing high-speed rotation to the second rotor.

In the structure mentioned above, the rotary shaft is rotated by electromagnetic action of the first rotor and the first stator, the rotary sleeve is rotated by electromagnetic action of the second rotor and the second stator. Accordingly, relative rotational frequency of the rotary shaft is added to the rotational frequency of the rotary sleeve to yield total rotational frequency of the rotary shaft. Thereby, it is possible to rotate the rotary shaft at high speed.

In this case, rotational frequency of the rotary shaft relative to the rotational sleeve and rotational frequency of the rotational sleeve relative to the housing are not necessary to be at high speed, so that it is easy to cool and lubricate the bearing, and thus the durability of the bearing is improved.

In the preferred embodiment of the present invention, a plurality of rotational sleeves are disposed between the rotary shaft and the housing and include an inner rotary sleeve and an outer rotary sleeve disposed in the outer periphery of the inner rotary sleeve, each of the inner rotary sleeve and outer rotational sleeve has a rotor with magnetic anisotropy and a stator at the inner peripheral portion thereof, and the stator has a field winding for magnetizing the rotor in predetermined direction and an armature winding for producing rotating force to the rotor.

In the case of the apparatus provided with the plurality of rotary sleeves, it is possible to rotate the rotary shaft at very high speed.

In the preferred embodiment of the present invention, the high-speed rotation of the rotary shaft is used to rotate a high speed main spindle for light cutting and grinding, and the high-speed rotation of the rotary sleeve is used to rotate a main spindle for heavy cutting and grinding.

From another aspect, the present invention provides an apparatus for producing high-speed rotation comprising:

- a first motor including a first rotor having magnetic anisotropy and a first stator corresponding to the first rotor, the first stator being formed in a rotary sleeve disposed around the first rotor, the first stator having a field winding for magnetizing the first rotor in a predetermined direction and an armature winding for producing the high-speed rotation to the first rotor; and
- a second motor including a second rotor integrally formed In the rotational sleeve and having magnetic anisotropy and a second stator disposed in a housing and corresponding to the second rotor, the second stator having a field winding for magnetizing the second rotor and an armature winding for producing the high-speed rotation to the second rotor.

With the structure mentioned above, the first rotor is rotated by the first motor and the second rotor is rotated by the second motor. Since the second rotor is integral with the first stator, the relative rotational frequency of the first rotor is added to the rotational frequency of the second yield total rotor to rotational frequency of the rotary shaft. Therefore, it is possible to rotate the rotary shaft at high speed.

In this case, since the rotational frequency of the first rotor relative to the first stator and the rotational frequency of the second rotor relative to the second stator are not necessary to be high, so that It is easy to cool and lubricate the bearing, and therefore the durability of the bearing is improved.

DESCRIPTION OF THE PREFERRED EMBODIMENT

With reference to the accompanying drawings, an apparatus for producing high-speed rotation according to the present invention will be described hereinafter.

Figure 1:
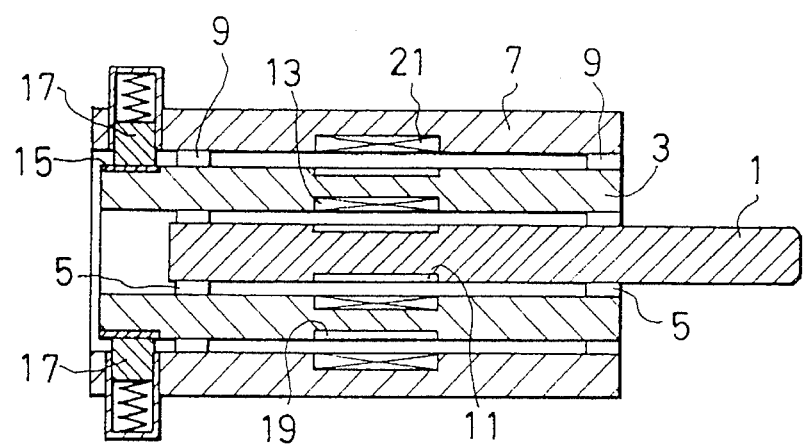
FIG. 1 is a elevational sectional view illustrating one embodiment of the apparatus for producing high-speed rotation according to the present Invention.
Figure 2:
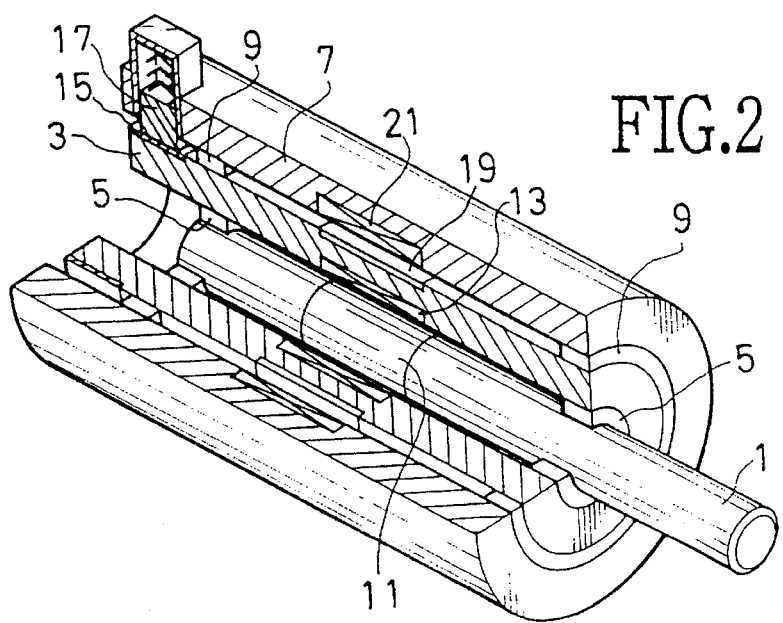
FIG. 2 Is a partially sectional perspective view illustrating one embodiment of the apparatus for producing high-speed rotation according to the present invention.

FIGS. 1 and 2 illustrate one embodiment of the apparatus for producing high-speed rotation according to the present Invention. Referring to these figures, the reference numeral 1 designates a first rotary shaft as a central rotary shaft. A second rotary shaft as a hollow outer rotary shaft (rotary sleeve) 3 is rotatably concentrically disposed around the central rotary shaft 1 through a bearing 5. A fixed cylinder 7 as a motor housing is concentrically disposed around the outer rotary shaft 3 and the fixed cylinder 7 rotatably supports the outer rotary shaft 3 through the bearing 9.

The central rotary shaft 1 integrally has a rotor of a first motor. The outer rotary shaft 3 has a stator 13 of the first motor in the inner peripheral portion and the stator 13 surrounds to the rotor 11.

An outer part of the outer rotary shaft 3 is equipped with a slipring 15 to feed electric power to a winding portion of the stator 13. The slipring 15 is in slidable contact with a electrical supply feeding brush 17 mounted on the fixed cylinder 7. According to this embodiment, the electrical supply uses the slipring 15 in this embodiment, but the electrical supply may alternatively use a non-contact rotary transformer.

The outer rotary shaft 3 integrally has a rotor 19 for a second motor at the outside thereof and the fixed cylinder 7 has a stator 21 for the second motor in the inner peripheral portion of thereof and the stator 21 surrounds to the rotor 19.

The configuration of the first motor having the rotor 11 and the stator 13 and the second motor having the rotor 19 and the stator 21 depends on the types of motors. In this embodiment shown in the drawings, the rotors 11 and 19 have no winding, and an induction motor or a brushless synchronous motor that does not require electric power to the rotors 11 and 19 is supposed. Therefore, an electrical supply for the rotors 11 and 19 is not provided. In the ease where a motor has rotors having windings to supply electric power thereto, the supply systems for the rotors are provided for the central rotary shaft 1 and the outer rotary shaft 3, respectively.

In the case where a motor utilizes magnetic anisotropy, the central rotary shaft 1 and the outer rotary shaft 3 have magnetic anisotropy by a magnetic slit or the like. The central rotary shaft 1 and the outer rotary shaft 3 are formed as the rotors 11 and 19 without the respective component parts. In this case, the stators 13 and 21 have an armature winding and a field winding for magnetically anisotropically magnetizing the center rotary shaft 1 and the outer rotary shaft 3, respectively.

Figure 3:
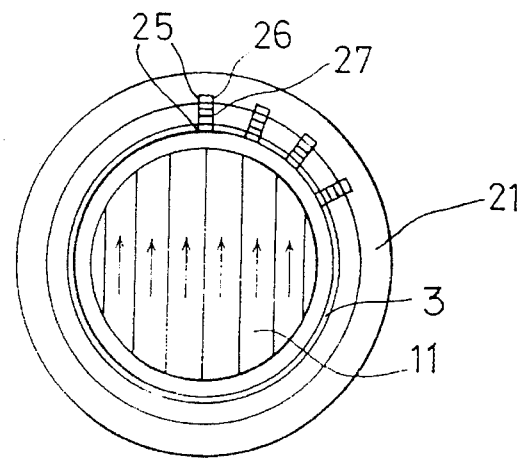
FIG. 3 is a conceptual and view illustrating a principle of the motor providing the apparatus for producing high-speed rotation according to the present invention.

With reference to FIG. 3, the principle of the synchronous motor employed in the present invention will be described hereinafter.

Referring to FIG. 3, the magnetically anisotropic rotors 11 and 19 are (rotor 11 is shown for example) made from a magnetically anisotropic magnetically body. The magnetic anisotropic magnetic body is made of the metal such as a grain-oriented silicon steel, a grain-oriented nickel or the like.

Alternatively, the magnetically anisotropic rotors 11 and 19 may be made from an isotropic body and formed in the shape of salient pole or supplied magnetic anisotropy by forming a slit.

The magnetically anisotropic rotors 11 and 19 described above are easy to be magnetized in a direction of an arrow, as shown is rotor 11 in FIG. 3, but difficult to be magnetized in a perpendicular direction to the direction of the arrow.

The stators 13 and 21 are respectively wound with a field winding 26 and an armature winding 27 (the latter indicated conceptually on the rudimentary showing of rotary sleeve 3) on respective magnetic cores 25. The phase difference between the field current and the armature current is a predetermined angle, preferably an angle of 90 degrees. Field magnetic flux is produced by field current to magnetize the magnetic anisotropic rotors 11 and 19 In a predetermined direction. Thereby, torque according to Fleming's rule is produced in the magnetic anisotropic rotor 11 and 19 by the field magnetic flux in the case of rotor 11, produced by the.

The motor with the structure described above has a simple structure since the rotors 11 and 19 have no permanent magnet or windings, the motor can provide silent rotation without vibration caused by magnetic vibration or some unbalance. Since the rotors 11 and 19 are not wound with windings, the rotors 11 and 19 are prevented from heating.

In the case where the rotors 11 and 19 each are made from a magnetic body having magnetic anisotropy, the rotors 11 and 19 can be formed in an optional shape. Therefore, the motor can rotate at high speed by forming the rotors 11 and 19 in circular section, respectively.

In the apparatus with the structure described above, the stators 13 and 21 are energized in the same rotational direction, respectively, the central rotary shaft 1 is then rotated relative to the outer rotary shaft 3 by the first motor and the outer rotary shaft 3 is rotated in the same direction as the central rotary shaft 1.

Therefore, the rotational frequency of the central rotary shaft 1 increases. It becomes the sum of the rotational frequency of the central rotary shaft 1 relative to the outer rotary shaft 3 and the rotational frequency of the outer rotary shaft 3. Where the rotational frequency of the first motor is the same as that of the second motor, the rotational frequency of the central rotary shaft 1 is two times of the rotational frequency of the outer rotary shaft 3.

Even if the rotation of the central axis 1 becomes two times as described above, the bearing load of the bearing 5 does not increase in proportion to the rotational frequency of the central axis 1 because the bearing load of the bearing 5 depends on the rotational frequency of the central rotary shaft 1 relative to the outer rotary shaft 3.

In this apparatus for producing high-speed rotation, the rotational power can be taken out from both the central rotary shaft 1 and the outer rotary shaft 3 at the same time. When this apparatus is used as a driving motor of a main spindle in a machine tool, the central rotary shaft 1 can be used for rotating a high speed main spindle for light cutting and grinding and the outer rotary shaft 3 can be used for rotating a main spindle for heavy cutting and grinding.

The first motor and the second motor are driven individually in different statuses by individual controlling of electrical power for the stators 13 and 21. For example, the rotational frequencies of the central rotary shaft 1 and the outer rotary shaft 3 can be varied by quantitative controlling the output values of the first motor and the second motor, individually. The rotational frequencies of the central rotary shaft 1 and the outer rotary shaft 3, respectively, can be varied when the rotational direction of the central rotary shaft 1 of the first motor is opposed to the rotational direction of the outer rotary shaft 3 of the second motor. In this case, the actual rotational frequency of the central rotary shaft 1 can be controlled to be the difference between the rotational frequency of the central rotary shaft 1 and that of the outer rotary shaft 3

In the embodiment described above, the apparatus for producing high-speed rotation has a coaxial double structure. Furthermore, the apparatus according to the present invention is not limited to this embodiment and may have a coaxial multiple structure. The rotational frequency of the central rotary shaft can be increased by three times, four times or the like.

While the present invention has been described as embodied in particular structure, it should be understood by those skilled in the art that various changes, omissions, and additions may be made herein without departing from the scope of the present invention.

What is claimed is:

1. An apparatus for producing high-speed rotation comprising:

a rotary shaft integrally including a first rotor having magnetic anisotropy, a rotary sleeve disposed around said rotary shaft, said rotary sleeve including a first stator surrounding said first rotor, said rotary sleeve integrally including a second rotor having magnetic anisotropy, said first stator having first winding means for magnetizing said first rotor in a predetermined direction and for producing high-speed rotation of said first rotor; and a housing having a second stator surrounding said second rotor, said second stator having second winding means for magnetizing said second rotor in a predetermined direction and for producing high-speed rotation of said second rotor.

2. The apparatus as claimed in claim 1, wherein said rotary shaft provides a first rotary output and said rotary sleeve provides a second rotary output.

3. The apparatus as claimed in claim 1, wherein said first and second stators are adapted to provide that electric phase difference between current through said first winding means and the current through said second winding mean.

4. An apparatus for producing high-speed rotation comprising:

a first motor including a first rotor having magnetic anisotropy and a first stator surrounding said first rotor, said first stator comprising a rotary sleeve disposed around said first rotor, said first stator having first winding means for magnetizing said first rotor in a predetermined direction and for producing the high-speed rotation to said first rotor; and a second motor including a second rotor integrally formed in said rotary sleeve and having magnetic anisotropy and a second stator disposed in a housing and surrounding said second rotor, said stator having second winding means for magnetizing said second rotor and for producing the high-speed rotation of said second rotor.

5. The apparatus as claimed in claim 4, wherein said first and second motors are adapted to provide that electric phase difference between the current passing through said first winding means and the current passing through said second winding means.

6. An apparatus for producing high-speed rotation comprising:

a rotary shaft integrally including a rotor having magnetic anisotropy, at least one rotary sleeve disposed around said rotary shaft, said rotary sleeve including a stator radially aligned with said rotor, said rotary sleeve integrally including an additional rotor radially aligned with said stator and having magnetic anisotropy, said stator having a winding; and a housing surrounding said at least one rotary sleeve and including an additional stator radially aligned with said additional rotor, said additional stator having an additional winding, whereby said apparatus provides at least two rotary outputs.

* * * * *